July 17, 1951     M. D. McCAULEY     2,560,882
EDGING TOOL
Filed April 16, 1947     2 Sheets-Sheet 1
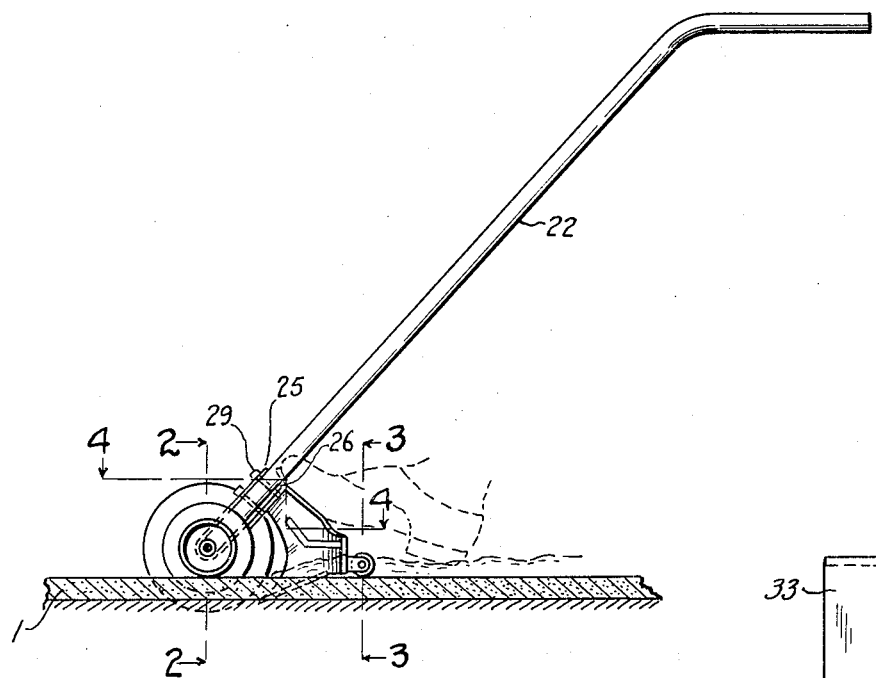
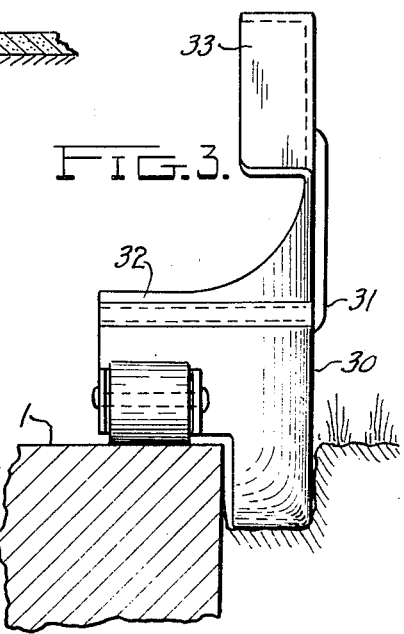
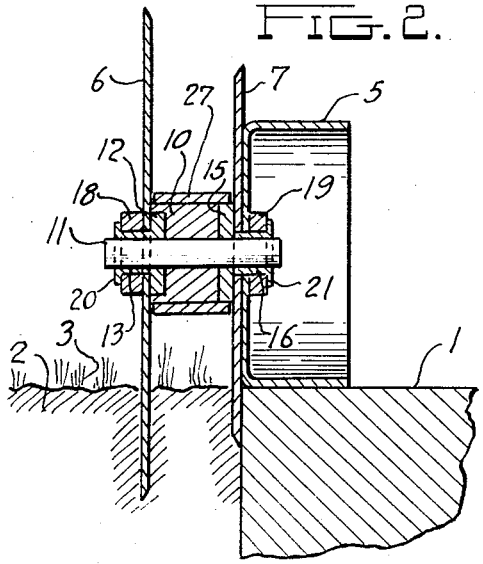
INVENTOR.
Myron D. McCauley
BY
Barnes Kisselle Laughlin & Raise
ATTORNEYS July 17, 1951  M. D. McCAULEY  2,560,882
EDGING TOOL Filed April 16, 1947  2 Sheets-Sheet 2

INVENTOR.
Myron D. McCauley
BY
Barnes Kisselle Laughlin & Raisch
ATTORNEYS

Patented July 17, 1951

2,560,882

UNITED STATES PATENT OFFICE 2,560,882

EDGING TOOL

Myron D. McCauley, Huntington Woods, Mich.

Application April 16, 1947, Serial No. 741,909

3 Claims. (Cl. 97—227)

This invention relates to an edging tool, and it has to do particularly with a tool for providing a neat trim arrangement at the intersection of a lawn and a structure such as a walk, driveway, curbing or the like.

The purpose of the invention is to provide an improved edging tool which is arranged to rest upon a walk, for example, and which can be moved along the walk with ease and facility to perform edging functions on the lawn. To this end, the tool is arranged to be pushed along the edge of the walk by means of the operator using a foot to propel the same, although a handle is preferably provided. The handle may be used to manipulate the tool although, if desired, some propelling forces may be applied to the tool by use of the handle.

In accordance with the invention, the tool embodies a roller for rolling upon the walk or other structure and a disc-like cutting knife for penetrating into the ground along the edge of the walk for making a cut in the earth. The tool also embodies a second disc-like member which may be in the form of a disc-knife arranged to project below the surface of the walk and to cut into the earth, and the principal function of this is to maintain the first mentioned cutting disc uniformly spaced from the edge of the walk. As the tool is moved along the intersection, between the walk and the lawn, it will thus be seen that two spaced cuts are taken in the earth and a sort of plough structure is located between the discs to cut into and plough out the narrow strip which remains between the two cuts. This plough structure embodies a guide structure which not only elevates but guides the removed earth outwardly into a position so that the same is deposited on the walk.

The accompanying drawings show one form of tool constructed in accordance with the invention and in these drawings:

Fig. 1 is a general view of the tool illustrating the same in use and showing how it may be propelled by the foot of the operator.

Fig. 2 is an enlarged cross sectional view taken substantially on line 2—2 of Fig. 1.

Fig. 3 is an enlarged fragmentary view taken substantially on line 3—3 of Fig. 1 showing the plough structure and the foot pad.

Figure 4:
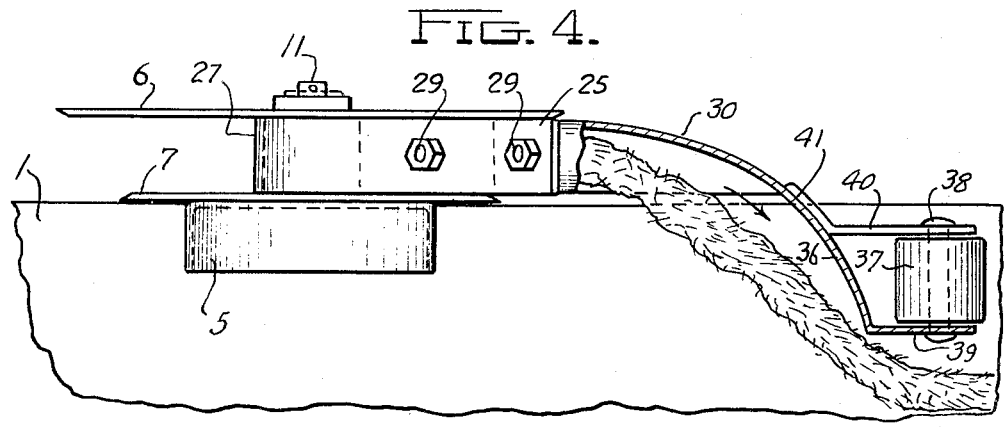
Fig. 4 is an enlarged view partly in section taken substantially on line 4—4 of Fig. 1 showing how the severed earth is manipulated to lie on the surface of the walk.

As illustrated in Figs. 1 and 2, a structure which may be concrete and which may be a walk, a driveway, a curbing or the like, is illustrated at 1 while adjacent the same is earth, as shown at 2, provided with a growth of grass 3 forming the lawn.

The tool, as shown in Fig. 2, comprises a supporting roller 5, a cutting disc 6 and a guide disc 7. In addition to serving as a guide, the disc 7 may also form a cut in the earth. These elements are mounted together as shown in Fig. 2 on a bearing member 10, in which is disposed an axle 11. The disc knife 6 may be mounted on a bearing member 12 which has a hub portion 13 and the member 12—13 may turn in the bearing member 10. The guide disc 7 and roller 5 may be mounted on a similar bearing member 15 having a hub portion 16 and the various elements may be held in position by means of washers 18 and 19 and cotter keys 20 and 21. Suffice it to say that the disc knife 6 and the guide disc 7 and roller 5 are freely rotatable in unison.

A suitable handle, which may be of tubular construction, is shown at 22 and a metal strap fashioned into U-shape has a leg 25 on one side of the handle and a leg 26 on the other side thereof with its bight portion 27 extending around the hub 10. Two or more bolts are passed through the handle and through the legs 25 and 26 as shown at 29 and thus the strap, the handle, and the hub are assembled together with the bight portion 27 clamping the hub 10.

Figure 5:
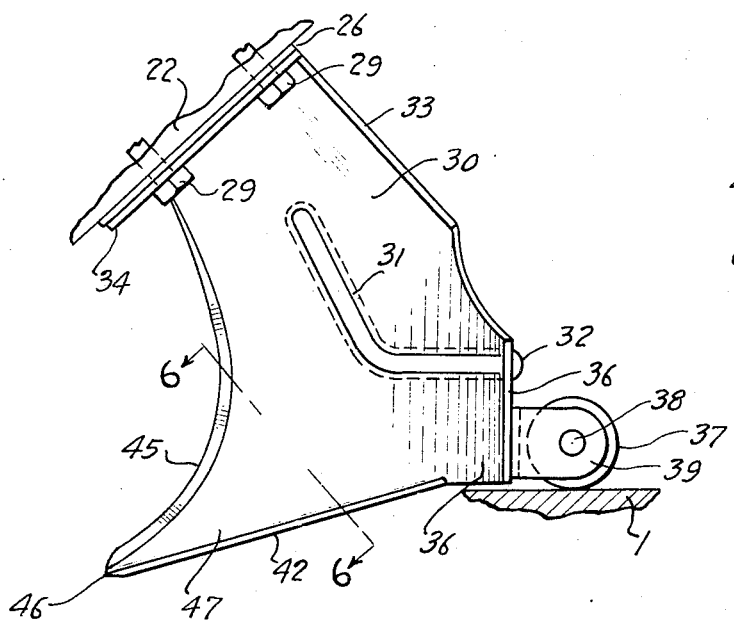
Fig. 5 is a side elevational view generally illustrating the structure of the body and plough structure.
Figure 6:
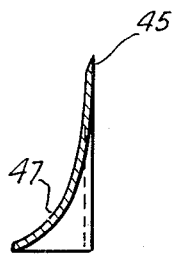
Fig. 6 is a sectional view taken substantially on line 6—6 of Fig. 5 showing the formation of the plough.

What may be termed the body of the structure may be a single piece of formed metal as illustrated in Figs. 3 and 5. This has a body portion 30 which may be ribbed or corrugated as at 31 and 32 for strength. The body has a flange 33 which provides a pad for receiving the foot of the operator and it has a flange 34. The bolts 29 pass through the flange 34 and thence through the strap 26 and handle 22 so that the handle and hub structure is bolted to the body.

The rear portion of the body is curved, as illustrated in Fig. 4, to provide the rear part 36 which overlies the walk structure 1. This rear structure preferably carries a roller 37 mounted on a pin or axle 38. This pin is carried between spaced elements 39 and 40, as shown in Figs. 4 and 5. The element 39 may be integral with the body portion 30 while the element 40 may be attached thereto as at 41.

The forward edge of the body is preferably curved and sharpened, as at 45, and it is fashioned into a sort of a plough point 46. Extending rearwardly from the plough point is an upwardly inclined guiding portion 42 which extends up to and partially above the level of the walk 1. This plough structure is of curved formation transversely of the tool as shown at 47, and the plough structure projects downwardly in the space between the disc 6 and the disc 7.

In use, the tool is disposed as substantially shown in Figs. 1 and 2 with the roller 5 resting upon the walk structure and the roller 37 also resting upon the walk structure. The tool may be manipulated into position by use of the handle 22. In this position, it will be noted, by reference to Fig. 2, that the disc 6 cuts into the earth and the guide disc 7 which is arranged to follow the edge of the walk may also cut into the earth. Also in this position the plough point 36 projects below the level of the earth and lies between the two discs 6 and 7. With the tool in this position, the operator may apply his foot to the pad 33, as illustrated in Fig. 1, and the operation resides merely in pushing the tool along the edge of the walk and as it progresses, the earth is severed, and a narrow strip of earth is cut by the plough point. This strip or cutting slides upwardly along the guide structure 42 and comes into engagement with the curved portion 36 and is deposited on top of the walk as illustrated in Fig. 1. As shown in Fig. 4, the severed material or strip is guided by the curve portion 36 so that it is deposited on the walk out of the path of the roller 37.

An edging tool thus constructed can be very easily operated with a minimum expenditure of physical energy, and the trimming of lawn along the sidewalk, or other structure in and about a residence, for example, may be quickly and easily accomplished. The pressure applied by the foot of the operator is not only downwardly so as to force the cutting discs into the ground but also forwardly. In this fashion, the tool may be progressed in somewhat of a step by step manner.

I claim:

1. A tool for edging a lawn or the like at the intersection between the lawn and a structure, such as a walk, comprising, a body fashioned from sheet metal and provided with a fixedly supported handle, a roller journalled at the forward end of the body and adapted to engage and operate upon the walk, a cutting disc mounted on the axis of the roller and axially spaced therefrom and adapted to cut into the earth along a line spaced from the roller as the tool is progressed along said intersection, a guide element adjacent said roller for extending along the side of the walk, said body having a rear portion fashioned to overlie the walk, a roller journalled on the rear portion of the body and projecting rearwardly therefrom and adapted to engage and operate on the walk whereby the tool is supported in a stable manner, the body having a plough-like cutting edge disposed substantially horizontally and having a width corresponding to the spacing between the said guide and the cutting disc for cutting the earth between the walk and the kerf formed by the cutting disc, said body having an upwardly inclined guide extending from the plough-like cutting edge for guiding the severed earth upwardly, the said rear portion of the body being angularly disposed and positioned rearwardly of the said guide whereby to displace the earth laterally and deposit same on the walk, said body having fixed thereon a rearwardly and downwardly inclined portion constituting a foot pad adapted to be engaged by the foot of the operator, whereby the tool may be progressed along the intersection by pressure of the foot by the operator, said foot pad being located between the first and second mentioned rollers so that the tool remains in a stable condition when pressure is applied by the foot of the operator in a downwardly angular direction.

2. A tool for edging a lawn or the like at the intersection between the lawn and a structure, such as a walk, comprising, a body fashioned from sheet metal, said body having a generally upright wall at one side thereof extending longitudinally of said body and having a handle rigidly connected thereto, a roller arranged to engage and operate on the walk, means journalling said roller forwardly of said body, said body having an upwardly and rearwardly inclined bottom wall disposed between said upright wall and said roller, a guide disc and a cutting disc mounted on the axis of the roller and spaced apart to correspond with the width of said bottom wall, said cutting disc being spaced axially from said roller and adapted to cut into the earth along a line spaced from the roller as the tool is progressed along said intersection, said upright wall having a laterally extending rear portion fashioned to overlie the walk, a second roller journaled on said laterally extending rear portion, and a rearwardly and downwardly inclined member fixed on said upright wall and constituting a foot pad, said foot pad being arranged to be engaged by the foot of the operator to propel the tool along said intersection and being located between said first and second rollers so that the tool remains in a stable position when pressure is applied to the foot pad at a downwardly inclined angle.

3. A tool for edging a lawn or the like at the intersection between the lawn and a structure, such as a walk, comprising, a body fashioned from sheet metal to provide a generally upright wall, the upper portion of said wall being bent to provide a forwardly and downwardly inclined bearing flange and a rearwardly and downwardly inclined bearing flange, said flanges being disposed generally perpendicular to the plane of said side wall, a handle member fixed to said forwardly inclined flange and extending angularly upwardly and rearwardly of said body, a roller journaled at the lower end of said handle and adapted to engage and operate on the walk, a guide member adjacent the roller adapted to extend downwardly along the edge of the walk at said intersection, a cutting disc mounted to rotate on the axis of the roller and spaced axially of the roller, said upright wall having the rear portion thereof bent laterally in the direction of said roller to overlie the walk, said laterally bent portion being spaced rearwardly of said rearwardly inclined flange, and a second roller for operating on the walk, means mounted on and projecting rearwardly of said laterally bent portion journaling said second roller, the lower portion of said upright wall being bent laterally towards said rollers to provide an upwardly and rearwardly inclined bottom flange which cooperates with said laterally bent rear portion to provide a track for guiding the severed earth upwardly from between said guide and cutting disc and laterally to a point on the walk along which the device is operated, said downwardly and rearwardly inclined flange providing a foot pedal for applying a downward and forward pressure to the tool at a point between said front and rear rollers.

MYRON D. McCAULEY.

REFERENCES CITED

The following references are of record in the file of this patent:

UNITED STATES PATENTS

| Number | Name | Date |
|---|---|---|
| 1,562,174 | Johnson | Nov. 17, 1925 |
| 1,660,177 | Reppe | Feb. 21, 1928 |
| 1,721,661 | Hawney | July 23, 1929 |
| 1,964,366 | Schwarz | June 26, 1934 |